United States Patent Office 3,634,294
Patented Jan. 11, 1972

3,634,294
SYNTHETIC LATICES AND METHOD OF PREPARING SAME
Donald N. De Mott, Midland, Mich., and Francis W. Stanton, Jr., Chevoit, Ohio, assignors to The Procter & Gamble Company, Cincinnati, Ohio
No Drawing. Filed Mar. 20, 1969, Ser. No. 809,047
Int. Cl. C08f 1/09, 3/00
U.S. Cl. 260—29.6 MQ
14 Claims

ABSTRACT OF THE DISCLOSURE

Compounds useful as emulsion polymerization surfactants, 2-acetoxy-alkanesulfonates, are disclosed. The compounds are particularly suited as emulsion polymerization surfactants in the preparation of low-foaming or non-foaming latices by aqueous emulsion polymerization of vinylic monomers. The synthetic latices and process for preparing them are described. The low-foaming and non-foaming latices find application in the preparation of adhesives, foams, polishes, coatings and the like.

---

This invention relates to synthetic latices and to processes for their preparation. More particularly, it relates to the preparation of improved synthetic latices from vinylic monomers and mixtures of vinylic monomers by aqueous emulsion polymerization.

Synthetic latices prepared by aqueous emulsion polymerization of monomers are well known and have become important in the preparation of adhesives, floor polishes, foams, synthetic rubbers and in the formulation of paints and coatings for textiles, leather, paper and the like. Synthetic latices adaptable to such applications must be characterized by a balance of desirable properties.

Synthetic latices adaptable to application in the coating arts, for example, must be of controlled particle size and viscosity and must exhibit low-foaming properties. In addition they should have high surface tension, superior chemical and mechanical stability, heat stability, freeze-thaw stability and pigment compatability. Coatings prepared by the curing of such latices must be water and heat resistant, have adequate tensile strength, plasticization properties, clarity, grain, luster and smoothness.

Numerous attempts have been made in the prior art to formulate latices from vinylic monomers having one or more of the aforementioned properties. A common approach to the preparation of such latices has been the employment of emulsifying agents which permit the production of latices exhibiting as great a number of the aforementioned properties as possible. While numerous emulsifying agents have been developed, serious deficiencies still exist, particularly with regard to the property of foaming. There has been a need for a class of emulsifying agents capable of exhibiting a balance of desirable properties including those of low-foaming tendency.

The tendency of latices to be either non-foaming or low-foaming is a desirable property which facilitates latex processing procedures and aids materially in the formation of high quality films or coatings. This property is especially advantageous in that it facilitates the formation of films which are substantially homogeneous and free of air bubbles and imperfections.

Excessive foaming during the processing and handling of latices is particularly bothersome in that it results in a loss of effective use of reaction vessels and containers. Latices exhibiting high foam levels require the use of larger reaction vessels than low-foaming latices for the processing of the same amount of latex. Similarly, the filling of tanks and drums is hampered by the propensity of latices to foam excessively.

The tendency of latices to foam or bubble during their application to substrates in the form of protective coatings results in a lower overall quality of coating than is generally desirable. Foaming or bubbling latices upon application to various material such as wood, paper, metal or the like result in the production of non-uniform films owing largely to the formation of air bubbles of varying dimensions the formation of which results in the finished film having minute imperfections contributing to an overall generally undesirable appearance.

The propensity of latices to foam during preparation and application has resulted in the employment of anti-foamants and/or defoamers in an attempt to facilitate the efficient processing and handling of latices and to improve the quality of coatings obtainable therefrom. The use of antifoamants to effectively minimize the formation of foam is subject to certain limitations, not the least of which is the tendency of many antifoamants to minimize foam formation at the expense of other desirable properties, e.g., water sensitivity and compatibility. Thus, there has been a need for emulsifying agents capable of producing latices of superior properties.

It is an object of the present invention to provide from vinylic monomers synthetic latices which are low-foaming or non-foaming.

It is a further object of the present invention to provide a process for preparing from vinylic monomers synthetic latices which are low-foaming or non-foaming.

Other objects will become apparent from a consideration of the invention described in greater detail hereinafter.

SUMMARY OF THE INVENTION

These and other objects of the present invention are attained in accordance with the present invention which comprises the provision of aqueous synthetic latices comprising a polymer of at least one vinylic monomer and an amount sufficient to effect emulsion polymerization of a polymerization surfactant having the formula

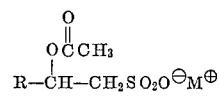

wherein R is alkyl of about 10 to 22 carbon atoms and M is a salt-forming radical. These compounds are referred to herein as 2-acetoxy-alkanesulfonates. Alternatively, they are termed β-acetoxy-alkanesulfonates.

Also provided by the present invention is a polymerization process which comprises polymerizing at least one vinylic monomer in an aqueous medium in the presence of an amount effective for emulsion polymerization of a 2-acetoxy-alkanesulfonate polymerization surfactant hereinbefore described.

The salt-forming radical $M^{\oplus}$ of the hereinbefore described structural formula can be, for example, an alkali metal cation (e.g., sodium, potassium, lithium), ammonium or a substituted-ammonium such as a quaternary ammonium cation. Specific examples of substituted-ammonium cations include methyl-, dimethyl-, trimethyl-, tetramethyl-ammonium cations and the like. Quaternary ammonium cations include dimethyl piperdinium cation and those derived from alkylamines such as ethylamine, diethylamine, triethylamine, mixtures thereof, and the like. The salt-forming radical serves to disperse the emulsion polymerization surfactant in the aqueous phase of the emulsion polymerization mixture. The salt-forming radical can be varied for compatibility with the polymerizable monomers, polymerization catalyst, pH and other additives. Preferred cations include sodium, potassium, lithium and ammonium for reasons that involve production and use of the surfactant.

Certain of the above-described 2-acetoxy-alkanesulfonates are known compounds. Belgian Pat. 650,323 issued July 9, 1963, discloses the preparation of certain 2-acyloxy alkanesulfonic acids. Similarly, U.S. Pats. 2,094,451 issued Sept. 28, 1937 to Guenther et al. and 2,086,215 issued July 6, 1937 to DeGroote disclose certain salts of β-acetoxy alkanesulfonic acids. The compounds per se and their methods of preparation do not constitute a part of the present invention. Rather, the present invention resides in synthetic latices from polymerizable monomers and in methods of preparing them.

As will be noted from the above-described structural formula, the polymerization surfactants utilizable herein are characterized by the presence of an anionic sulfonate moiety, a long-chain hydrophobic group and an acetoxy group, the acetoxy group being attached to a carbon atom adjacent to the terminal sulfonate moiety. While the precise theory or mechanism according to which the surfactants of the present invention function to provide low-foaming synthetic latices of high surface tension is not completely understood, it is believed that the steric effect of the acetoxy group on the close packing of surfactant molecules is involved. It has been found that the length of the hydrophobic group as well as the presence of a 2-acetoxy substituent on the hydrophobic group constitute critical aspects of the present invention. It has been found that when the alkane group contains less than about 12 carbon atoms, the low-foaming tendency of the polymerization surfactants of the present invention is not found. Similarly, the preparation of low-foaming synthetic latices is not attained in the case of the use of an alkanesulfonate which does not contain the 2-acetoxy group found to be essential in the practice of the present invention. Preferred 2-acetoxy-alkanesulfonates are those having an alkane group of about 16 to about 22 carbon atoms and are preferred from the standpoint of effectiveness in supporting low-foaming polymerization reactions. These materials are characterized by the presence of an alkyl R group of about 14 to about 20 carbon atoms in the hereinbefore described formula.

Specific examples of 2-acetoxy-alkanesulfonates, utilizable herein to form synthetic latices characterized by low-foaming properties include sodium 2-acetoxy-dodecanesulfonate;
potassium 2-acetoxy-dodecanesulfonate;
sodium 2-acetoxy-tridecanesulfonate;
potassium 2-acetoxy-tetradecanesulfonate;
lithium 2-acetoxy-tetradecanesulfonate;
sodium 2-acetoxy-pentadecanesulfonate;
ammonium 2-acetoxy-hexadecanesulfonate;
sodium 2-acetoxy-hexadecanesulfonate;
dimethyl ammonium 2-acetoxy-heptadecanesulfonate;
potassium 2-acetoxy-octadecanesulfonate;
dimethyl piperdinium 2-acetoxy-octadecanesulfonate;
dimethylamine 2-acetoxy-octadecanesulfonate;
potassium 2-acetoxy-nonadecanesulfonate;
sodium 2-acetoxy-eicosanesulfonate;
sodium 2-acetoxy-uncosanesulfonate;
sodium 2-acetoxy-docosanesulfonate;
potassium 2-acetoxy-tricosanesulfonate;
sodium 2-acetoxy-tetracosanesulfonate; and isomers thereof.

The synthetic lactices of the present invention can be prepared by emulsion polymerization of vinylic monomers and mixtures of vinylic monomers. According to the process of the present invention, homopolymers and copolymers (including terpolymers) are provided by effecting the aqueous emulsion polymerization of one or more vinylic monomers in the presence of an amount effective for emulsion polymerization of a 2-acetoxy-alkanesulfonate hereinbefore described. As employed herein the specification and claims, the term vinylic monomer contemplates ethylenically unsaturated polymerizable monomers characterized by the presence of the $CH_2=C<$ group.

Normally, at least one of the disconnected valences is attached to an electroactive group, i.e., a group which substantially increases the electrical dissymmetry or polar character of the molecule. Examples of vinylic monomers and mixtures of monomers utilizable herein include the following:

(1) Styrene, chloro-substituted styrenes, and methyl-substituted styrenes, mixtures thereof, and mixtures with other monomers such as butadiene, acrylonitrile, acrylic acid, methacrylic acid and the like.

(2) Vinyl chloride, vinyl acetate, and vinylidene chloride, mixtures thereof, and mixtures with other monomers such as acrylonitrile, butyraldehyde, ethylene, methyl methacrylate, butadiene, isobutylene, maleic esters such as diethyl maleate and dibutyl maleate, and the like.

(3) Acrylonitrile, methacrylonitrile, and mixtures thereof with butadiene isobutylene, vinylidene chloride, chloroprene, maleic esters such as diethyl maleate and dibutyl maleate, and the like.

(4) Acrylates such as methyl acrylate, methyl methacrylate, phenyl methacrylate, tertiary amyl methacrylate, 2-ethylhexyl methacrylate, mixtures thereof, and mixtures for example, with styrene, 2-methyl styrene, butadiene, acrylonitrile, acrylic acid, methacrylic acid, and vinyl acetate.

(5) Butadienes, particularly, the 1,3-butadienes such as 2-methyl-1,3-butadiene (isoprene); piperylene; 2,3-dimethylbutadiene-1,3, mixtures thereof, and mixtures with styrene, 2-methyl styrene, acrylonitrile, methyl methacrylate, ethyl acrylate, vinyl naphthalene, methacrylamide, vinylidene chloride, methyl vinyl ether, methyl vinyl ketone, acrylic acid, methacrylic acid and the like.

(6) Chloroprene and other 2-halo-butadienes, such as the analogs and homologues of chloroprene; 2,3-dichloro-1,3-butadiene; mixtures thereof, and mixtures with styrene, acrylonitrile, and the like.

Particularly preferred monomers or monomer mixtures are vinyl acetate, vinyl chloride, butadiene-styrene, and the acrylics, particularly mixtures with vinyl acetate such as vinyl acetate-ethyl acrylate, vinyl acetate-2-ethyl hexyl acrylate, vinyl acetate-dibutyl maleate, vinyl acetate-acrylate esteracrylic acid, vinyl acetate-acrylate ester itaconic acid, vinyl acetate, acrylamide, and vinyl acetate-methylol acrylamide; these being preferred by reason of their adaptability to a variety of coating and adhesive applications.

It will of course be appreciated that the aforedescribed monomers and mixtures of monomers are described by way of example only and represent those materials which are generally known and available and which undergo emulsion polymerization. Likewise other vinylic monomers other than those specifically enumerated can be polymerized is the presence of a 2-acetoxy-alkanesulfonate polymerization surfactant to provide synthetic latices having low-foaming properties.

The production of synthetic latices in accordance with the present invention is effected by polymerizing a vinylic monomer or mixture of monomers in an aqueous medium in accordance with polymerization methods known in the art. The monomer or monomers utilizable herein can be polymerized by forming an aqueous emulsion of the vinylic monomer or mixture of monomers and 2-acetoxy-alkanesulfonate and initiating polymerization with a polymerization initiator of the conventional free-radical-forming type. While the polymerization reaction can be effected in accordance with a batch technique whereby a premixed emulsion of monomer or mixture of monomers of the oil-in-water type is polymerized with a polymerization initiator, the polymerization reaction can also be effected by the continuous or delayed addition of monomer or monomers to an initiated system.

The emulsion polymerization of the present invention can be conducted over a wide range of temperatures depending upon the particlar monomers being polymerized.

Suitable temperatures for effecting the polymerization range from about −10° C. to about 180° C. Preferably, the polymerization is conducted at a temperature of about 25° C. to about 100° C. In the case of the homopolymerization of styrene, for example, the polymerization reaction is conducted at a temperature of about 25° C. to about 70° C. The amount of 2-acetoxy-alkanesulfonate surfactant employed herein in the preparation of emulsions polymerizable to form synthetic latices of the hereinbefore described type varies with the nature of monomer or monomers employed in the polymerization. A small amount sufficient to form an aqueous emulsion of polymerizable monomers, and corresponding to about 0.5 to 6% by weight of the monomer or mixtures of monomers empolyed, can be utilized herein. Preferably, an amount of about 0.7 to about 2.5% of the 2-acetoxy-alkylanesulfonate is employed.

The relative proportions of co-monomers employed in the preparation of copolymers will vary depending upon the particular properties desired in the polymer. The 2-acetoxy-alkanesulfonates of the invention permit the preparation by emulsion polymerization of a wide range of products as to composition and properties with a correspondingly wide range of end uses. In the preparation of styrene-butadiene latices suitable for the preparation of latex paints, for example, a ratio in parts by weight of styrene to butadiene of about 0.8:1 to about 4:1, and preferably about 1.5:1 to about 3:1 is employed. Similarly, emulsion polymerization of a mixture of about 0.25:1 to about 5:1, respectively, of lower alkyl acrylates, e.g. butyl acrylate and lower alkyl methacrylates, e.g. methyl methacrylate, provide latices adapted to use in the preparation of water-based adhesives, foamed carpet backings, water-based latex paint formulations and the like. Other proportions can be employed to provide low-foaming or non-foaming latices adapted to a variety of end uses.

The amount of water employed in the emulsion polymerization process herein varies with the solids content desired for the final latex and can be varied to provide latices ranging from liquid to salve-like or gel consistency. Preferably, about 30 to about 400 parts of water by weight are used per 100 parts of monomer mixture. The resulting latices are aqueous compositions having solids contents of from about 20% to about 75%.

The polymerization reaction can be conducted in a reaction vessel provided with stirring means and an external means of supplying or removing heat. Normally, the polymerization is conducted by charging an initially prepared monomeric emulsion to the reaction vessel and raising the temperature, adding a polymerization initiator with stirring and allowing the reaction to continue until substantial conversion of monomer to polymeric latex has taken place. In accordance with the present invention, the employment of a 2-acetoxy-alkanesulfonate facilitates the efficient processing of latex in that the level of foam resulting from agitation is minimized and the reactive capacity of the reaction vessel employed is maximized. The presence of the 2-acetoxy-alkanesulfonate as an integral part of the latex particles serves also to minimize foam formation subsequent to completion of polymerization, i.e., during subsequent agitation, shaking, pumping application to a substrate or the like.

Suitable polymerization initiators or catalysts include conventional free radical-generating initiators such as the "per" compounds. Examples include inorganic and organic peroxides and per salts such as benzoyl peroxide, benzoyl acetyl peroxide, lauryl peroxide, tertiary butyl perbenzoate, peracetic acid, acetyl peroxide, hydrogen peroxide, tertiary butyl hydroperoxide, sodium peroxide, barium peroxide, potassium persulfate, percarbonate or perborate. Two or more such initiators can be employed if desired. When the polymerization is conducted at temperatures below reflux, initiators of the redox type can be used, e.g., potassium persulfate with sodium bisulfite, hydrogen peroxide with ferrous sulfate, hydrogen peroxide with ferric sulfate and sodium pyrophosphate. Certain azo derivatives, e.g., 2,2′-azodiisobutyronitrile are also useful. The initiator should be employed in an amount of about 0.01 to 1.0% by weight of the monomer or mixture of monomers employed in the polymerization reaction.

The range of pH of the emulsion polymerized in accordance with the present invention can be regulated with the aid of a buffering agent. Normally, the polymerization reactions conducted in accordance with the present invention are conducted at pH's between 2 and 11 and any water-soluble buffering agent which will maintain the pH of the emulsion within this range can be employed.

Typical of the buffering agents which can be employed are such compounds as sodium carbonate, potassium carbonate, ammonium carbonate, sodium acetate, potassium acetate, sodium bicarbonate, sodium phosphate, potassium phosphate, ammonium phosphate, sodium tetraborate, potassium tetraborate and the like. These compounds can be employed individually or in various combinations thereof.

In like manner any of the conventional regulators, (e.g., diisopropyl xanthate, octylmercaptan), stabilizers (e.g., gelatin, carboxymethyl cellulose), activators (e.g., ferrous ion plus $AgHSO_3$, $NaHSO_3$ or $Na_2S_2O_4$), electrolytes (e.g., KCl, $KNO_3$) or the like can be employed herein to advantage.

The synthetic latices prepared according to the present invention are characterized herein as being non-foaming or low-foaming. The foaming propensities of synthetic latices can be determined conveniently by a number of methods. A simple method of determining relative degrees of foaming involves visual observation of a latex subsequent to vigorous shaking. Another suitable means involves mechanical stirring of the latex and observation of increased volume. Such a method is illustrated hereinafter.

The following examples are given in illustration and are not intended as limitations on the scope of this invention. Where parts are mentioned, they are parts by weight.

EXAMPLE I

A styrene synthetic latex was prepared from the following materials:

| Components: | Parts by weight |
|---|---|
| Styrene | 135 |
| Sodium 2-acetoxy-tetradecanesulfonate | 4.05 |
| Potassium persulfate | 0.405 |
| Water (deionized) | 210.6 |

The emulsifier was dissolved in about 90% of the deionized water and charged into a suitable reaction vessel. The reaction vessel was brought to reaction temperature, 60° C., and the styrene was added with agitation. A solution of potassium persulfate in the remaining amount of water was added at a uniform rate during the first 20 minutes of the polymerization. The reactor was cooled to approximately 25° C. and the reaction was terminated after two hours. A very low order of foam formation was observed during the polymerization. The latex was filtered through an 80 mesh stainless steel screen to remove any coagulum from the resulting polymer.

EXAMPLES II TO IV

Styrene was polymerized to a latex in substantially the same manner as in Example I except that sodium 2-acetoxy-tetradecanesulfonate was replaced by sodium 2-acetoxy-hexadecanesulfonate (Example II); sodium 2-acetoxy-octadecanesulfonate (Example III); and sodium 2-acetoxy-eicosanesulfonate (Example IV). The polymers formed upon completion of polymerization were characterized by a low order of foam formation.

Substantially similar results are obtained in the stable, low-foaming latices are produced when styrene in the above examples is replaced by the following: methylstyrene; chlorine-substituted styrene or mixtures thereof.

EXAMPLE V

A stable, non-foaming latex was prepared from the following materials:

| Components: | Parts by weight |
|---|---|
| Butadiene | 12.5 |
| Styrene | 112.5 |
| Sodium 2-acetoxy-hexadecanesulfonate | 5.4 |
| $K_2S_2O_8$ (as 0.17 M solution) | 5.6 |
| KCl (as 4 M solution) | 8.4 |
| Water | 108.0 |

The polymerization reaction was conducted in a 32 oz. beverage bottle fitted with a nitrile-butyl rubber septum adapted to addition or removal of fluid by means of a hypodermic syringe. Deionized, deaerated water, freshly distilled styrene, and KCl were charged into the beverage bottle. The surfactant was added and the bottle was capped with a cap described above. The bottle was sparged with nitrogen and butadiene was added. The $K_2S_2O_8$ initiator solution was introduced by aid of a syringe and the bottle was rotated at 24 r.p.m. end-over-end at 122° F. until completion of polymerization.

Substantially similar results are obtained in that stable low-foaming latices are prepared when styrene is replaced by a methyl styrene, a chlor-styrene or mixture thereof. Similarly, butadiene can be replaced by acrylonitrile, methacrylonitrile, acrylic acid, methacrylic acid or mixtures thereof.

EXAMPLE VI

A smooth, low-foaming, stable latex was provided by polymerization of the following ingredients:

| Component: | Parts by weight |
|---|---|
| Vinyl chloride | 300 |
| Sodium 2-acetoxy-octadecane sulfonate | 7.5 |
| $K_2S_2O_8$ | 1.8 |
| Water | 600 |

The polymerization (substantially 100% conversion) was effected by introducing the deionized water, acetoxy alkanesulfonate and $K_2S_2O_8$ into a high-pressure reaction vessel adapted with stirring means, sparging with nitrogen and introducing the vinyl chloride monomer. The ingredients were allowed to react in the closed reactor at a temperature of 60° C. for 50 minutes. The reaction mass was agitated during reaction by means of an agitator rotating at 300 r.p.m. There was substantially no foam generated during the reaction or subsequent to reaction by further agitation, stirring or shaking.

Substantially similar results are obtained when vinylidene chloride is employed in lieu of vinyl chloride in that a low-foaming, stable latex is formed.

EXAMPLE VII

A vinyl acetate fluid, low-foaming latex is prepared by polymerization of the following ingredients:

| Components: | Parts by weight |
|---|---|
| Vinyl acetate | 100 |
| Sodium bicarbonate (as 1% aqueous solution) | 10 |
| $K_2S_2O_8$ (as 1% aqueous solution) | 30 |
| Potassium 2-acetoxy-eicosane-sulfonate | 2.5 |
| Water | 100 |

To a suitable reaction vessel is added the 2-acetoxyalkanesulfonate solution, the sodium bicarbonate solution, the required amount of water and the vinyl acetate.

The mixture is then purged with nitrogen below its surface for 5 to 10 minutes. Following the purge, the potassium persulfate solution is added and the reaction vessel is capped securely. Thereafter the vessel containing the reaction mixture is placed in rotating holders in a water bath heated to 125° F. and is reacted at this temperature for 15 to 20 hours while slowly rotating the reaction vessel holders to achieve agitation of the reaction mixture. Following reaction, the reaction vessel is removed, cooled, and the resulting polymer latex is filtered to remove any coagulum.

Substantially similar results are obtained when part of the vinyl acetate is replaced with methyl methacrylate, diethyl maleate, vinyl chloride, or vinylidene chloride.

EXAMPLE VIII

A smooth, low-foaming latex is provided by polymerizing the following ingredients:

| Components: | Parts by weight |
|---|---|
| Vinyl chloride | 50 |
| Isobutylene | 33 |
| Water (deionized) | 150 |
| Lithium 2-acetoxy-hexadecane-sulfonate | 2.2 |
| Potassium persulfate | 0.5 |

The vinyl chloride and isobutylene are admixed at about −20° C., the mixture is added to a closed reactor or bomb together with the other ingredients and reacted at 60° C. for 100 hours while being continuously agitated. The resulting latex has highly desirable properties.

Substantially similar results are obtained in that a stable low-foaming latex is obtained when the following are employed in lieu of isobutylene: acrylonitrile, methyl methacrylate, butadiene, diethyl maleate, dibutyl maleate or mixtures thereof.

EXAMPLE IX

A fluid, stable, low-foaming latex is prepared from the following materials:

| Components: | Parts by weight |
|---|---|
| Acrylonitrile | 140 |
| Butadiene | 400 |
| Sodium 2-acetoxy-octadecane-sulfonate | 12 |
| Hydrogen peroxide (as 15% solution) | 20 |
| Water (deionized) | 970 |

To a solution of the 2-acetoxy-alkanesulfonate in water in a beverage bottle reaction vessel are added the acrylonitrile, the hydrogen peroxide and butadiene in turn. The butadiene is added after capping with the aid of a syringe, the beverage bottle is sparged with nitrogen and the polymerization is conducted in the capped bottle at about 40° C. for about 15 hours with agitation. Substantially similar results can be obtained when butadiene is replaced by isobutylene or when acrylonitrile is replaced by methacrylonitrile in that a low-foaming, stable latex is obtained.

EXAMPLE X

A stable, substantially non-foaming latex was prepared from the following ingredients:

| Components: | Parts by weight |
|---|---|
| Butyl acrylate | 178 |
| Methyl methacrylate | 120 |
| Methacrylic acid | 2 |
| $K_2S_2O_8$ | 0.1 |
| Potassium 2-acetoxy-tetracosane-sulfonate | 4.5 |
| Water | 318 |

80 grams of water and 80 grams of monomer emulsion prepared by blending the monomer, surfactant and all but 80 grams of the total amount of water were added to a reaction flask immersed in an oil bath at 95° C. The reaction temperature reached 94° C. after which the remaining portion of monomer was added over a period of 1½ hours. Heating for an additional half hour was conducted. The pH was adjusted between 9 and 10 with ammonia and the latex was cooled to about 40° C. The product was filtered through a 100 mesh screen. The percent total solids was about 46.6%. The latex foamed very little upon vigorous shaking.

Substantially similar results are obtained when the following acrylates, methacrylates, acids or mixtures thereof are polymerized in like manner: methyl acrylate, ethyl acrylate, isobutyl methacrylate, phenyl methacrylate, tertiary amyl methacrylate 2-ethylhexyl methacrylate, acrylic acid, methacrylic acid.

EXAMPLE XI

Chloroprene is polymerized in a stable, smooth latex from the following ingredients:

| Components: | Percent by weight |
| --- | --- |
| Chloroprene | 100 |
| Tertiary dodecyl mercaptan | 0.40 |
| Water (deionized) | 100 |
| Ammonium 2-acetoxy-tetradecanesulfonate | 2.6 |

The chloroprene is admixed with a solution of emulsifier, the chloroprene being added gradually with active stirring and in the absence of oxygen. The polymerization is allowed to proceed for about 20 hours in a closed reactor under conditions of cooling to maintain the temperature at about 20° C. The resulting synthetic latex has excellent stability and fluidity and exhibits little tendency to foam upon agitation.

Substantially similar results are obtained when the following materials are employed in place of a part of the chloroprene: styrene, acrylonitrile and methacrylonitrile.

EXAMPLE XII

Vinyl acetate/2-ethylhexyl acrylate monomers are polymerized to a low-foaming latex from the following ingredients:

| Components: | Percent by weight |
| --- | --- |
| Vinyl acetate | 90 |
| 2-ethylhexyl acrylate (containing 50 p.p.m. hydroquinone) | 10 |
| Sodium bicarbonate (as 1% aqueous solution) | 10 |
| Potassium persulfate (as 1% aqueous solution) | 30 |
| Potassium 2-acetoxy-octadecanesulfonate | 5 |
| Water | 70 |

The procedure of Example VII when employed herein produces a smooth, fluid latex exhibiting excellent properties.

Excellent low-foaming latices can by a substantially similar process be prepared from the following monomer mixtures: vinyl acetate/ethyl acrylate, vinyl acetate/dibutyl maleate, vinyl acetate/methacrylate/acrylic acid, vinyl acetate/ethyl acrylate/methacrylic acid, vinyl acetate/methyl acrylate/itaconic acid, vinyl acetate/acrylamide and vinyl acetate/methylol acrylamide.

EXAMPLE XIII

A stable, low-foaming latex suitable for use in the formulation of water based paints is prepared from the following material employing the procedure of Example V.

| Components: | Percent by weight |
| --- | --- |
| Butadiene | 40 |
| Styrene | 80 |
| Ammonium 2-acetoxy-dodecanesulfonate | 5 |
| $K_2S_2O_8$ (0.17 M solution) | 5 |
| KCl (4 M solution) | 8 |
| Water | 110 |

Similar results are obtained when the following emulsion polymerization surfactants are employed in place of the ammonium 2-acetoxy-dodecanesulfonate in that low-forming latices are obtained:

potassium 2-acetoxy-dodecanesulfonate;
sodium 2-acetoxy-tridecanesulfonate;
potassium 2-acetoxy-tetradecanesulfonate;
lithium 2-acetoxy-tetradecanesulfonate;
sodium 2-acetoxy-pentadecanesulfonate;
ammonium 2-acetoxy-hexadecanesulfonate;
sodium 2-acetoxy-hexadecanesulfonate;
dimethyl ammonium 2-acetoxy-heptadecanesulfonate;
potassium 2-acetoxy-octadecanesulfonate;
dimethyl piperidinium 2-acetoxy-octadecanesulfonate;
dimethylamine 2-acetoxy-octadecanesulfonate;
potassium 2-acetoxy-nonadecanesulfonate;
sodium 2-acetoxy-eicosanesulfonate;
sodium 2-acetoxy-uncosanesulfonate;
potassium 2-acetoxy-tricosanesulfonate;
sodium 2-acetoxy-tetracosanesulfonate; and
and isomers thereof.

Styrene latices were prepared employing the procedure of Examples I to IV except that commercially available surface active agents were substituted for the 2-acetoxy-alkanesulfonates and 1.5 parts of potassium chloride electrolyte was employed in each instance. These examples were buffered with sodium bicarbonate to maintain the pH in the region of 7.5 to 8.5.

The commercial emulsifiers were Surfactant A (sodium lauryl sulfate), Surfactant B (sodium salts of sulfated and ethoxylated alcohols), Surfactant C (disodium 4-dodecyl oxydibenzenesulfonate).

The resulting synthetic latices were evaluated according to the following procedures, the results being tabulated in Table 1.

Mechanical stability test

A 50 g. sample of 50% total solids-containing latex is placed into an approximately 500 ml. glass container. The stirrer shaft to which is affixed a small diameter disk is immersed close to the bottom of the container and mixed for 30 minutes at a speed of about 14,000 r.p.m. The latex after completion of the test is filtered to collect any coagulum formed as a result of the test. The coagulum is rinsed gently with distilled water, dried and the amount of coagulum weighed.

Foaming test

A 150 ml. sample of a 10% total solids-containing latex is placed into a 500 ml. glass container. The stirrer blade of a Hamilton Beach mixer is immersed into the container and operated at about 14,000 r.p.m. for a period of 15 minutes or until total coagulation occurs. The amount of foam is determined by comparing the final volume of latex and foam with the initial volume of 150 ml. For purposes of the present invention, low-foaming latices are those which under the conditions of this test produce less than about 75 ml. of foam. Non-foaming latices are those which are substantially free of foam and produce less than about 10 ml. of foam. Samples which totally coagulate within the test period are unsatisfactory.

Surface tension test

The surface tension of a latex is determined by a DuNouy tensiometer and is expressed in dynes/cm. A latex having high surface tension has a surface tension corresponding to about 50 to 72 dynes/cm.

Freeze-thaw stability test

A 50 g. sample of 50% total solids latex is placed into a 1″ x 8″ test tube and placed for 30 minutes into a 4300 ml. Dewar flask containing an acetone/$CO_2$ mixture providing a temperature of −20° C. The same if not frozen within 30 minutes is allowed to remain until frozen whereupon the sample is immersed for 30 minutes into a 27° C. bath. Upon completion of the resulting thaw, the sample is visually inspected for coagulum formation and the cycle is repeated. The number of freeze-thaw cycles (one freezing and one thawing constitute one cycle) that the latex can withstand with minimal amounts of coagulum formation denotes the degree of freeze-thaw stability.

TABLE 1

|  | Examples | | | | Surfactants | | |
| --- | --- | --- | --- | --- | --- | --- | --- |
|  | I | II | III | IV | A | B | C |
| Mechanical stability (coagulum) | None | None | None | None | None | (¹) | None |
| Foaming (ml. foam) | None | None | None | None | 220 | (¹) | 180 |
| Surface tension (dynes/cm.) | 59 | 62 | 58 | 70 | 54 | 58 | 47 |
| Freeze thaw stability (cycles) | 2 | 2 | 2 | 3 | 1 | 1 | 1 |

¹ Total coagulation.

As can be determined from Table 1, the latices prepared from the 2-acetoxy-alkanesulfonate emulsion polymerization surfactants of Example I to IV exhibited a balance of superior mechanical stability and freeze-thaw stability as well as surface tension and low-foaming properties. Synthetic latices prepared from the emulsion polymerization surfactants of the present invention exhibit a balance of desirable properties, particularly with respect to their tendencies to produce low orders of foam during polymerization and subsequent to their preparation by vigorous shaking or agitation.

Synthetic latices prepared in accordance with the present invention are fine aqueous dispersions of polymeric particles ranging from light viscous liquids to pasty masses of salve-like consistency depending largely on the amount of water employed in the polymerization reaction and the particular monomers polymerized. The polymers prepared in accordance with the present invention can be cured or dried to form films making them adaptable as vehicles for coating or paint compositions for a variety of substrates. They can be compounded with suitable pigments, resinous materials, fillers, thickening agents, plasticizers, stabilizing agents or the like for use in these applications. In addition, certain of the latices herein can be employed in the preparation of floor polishes, adhesives, foamed polymeric articles, carpet backings and the like.

Having described the invention in detail, we claim:

1. A low foaming aqueous synthetic latex composition, having a total solids content of from about 20% to about 75% by weight, comprising a polymer of at least one ethylenically unsaturated polymerizable monomer characterized by the presence of the $CH_2=C<$ group and about 0.5% to about 6%, based on weight of monomer of a 2-acetoxy-alkanesulfonate polymerization surfactant having the formula

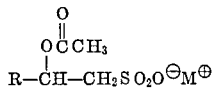

wherein R is alkyl of about 10 to about 22 carbon atoms and M⊕ is a salt forming radical selected from the group consisting of alkali metal, ammonium and substituted ammonium cations wherein the substituted ammonium cations are selected from the group consisting of methyl, dimethyl, trimethyl and tetramethyl ammonium and dimethyl piperidinium ions.

2. The synthetic latex of claim 1 wherein R is alkyl of about 14 to about 20 carbon atoms.

3. The synthetic latex of claim 2 wherein M⊕ is an alkali metal salt-forming radical selected from the group consisting of sodium, potassium and lithium.

4. The synthetic latex of claim 3 wherein the polymer is a homopolymer of styrene.

5. The synthetic latex of claim 3 wherein the polymer is a homopolymer of vinyl acetate.

6. The synthetic latex of claim 3 wherein the polymer is a homopolymer of vinyl chloride.

7. The synthetic latex of claim 3 wherein the polymer is a copolymer of styrene and butadiene.

8. A process of providing low-foaming aqueous synthetic latices which comprises polymerizing at least one ethylenically unsaturated polymerizable monomer characterized by the presence of the $CH_2=C<$ group in an aqueous medium in the presence of from about 0.5% to about 6% based on weight of monomer, of a 2-acetoxy-alkanesulfonate polymerization surfactant having the formula

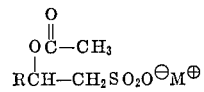

wherein R is alkyl of about 10 to about 22 carbon atoms and M⊕ is a salt forming radical selected from the group consisting of alkali metal, ammonium and substituted ammonium cations wherein the substituted ammonium cations are selected from the group consisting of methyl, dimethyl, trimethyl and tetramethyl ammonium and dimethyl piperidinium ions.

9. The process of claim 8 wherein R is alkyl of about 14 to about 20 carbon atoms and M⊕ is an alkali metal selected from the group consisting of sodium, potassium and lithium.

10. The process of claim 9 wherein about 30 to about 400 parts of water per 100 parts by weight of monomer are employed.

11. The process of claim 9 wherein the monomer polymerized is styrene.

12. The process of claim 9 wherein the monomer polymerized is vinyl acetate.

13. The process of claim 9 wherein the monomer polymerized is vinyl chloride.

14. The process of claim 9 wherein the monomer polymerized is a mixture of styrene and butadiene.

References Cited

UNITED STATES PATENTS

| 2,094,451 | 9/1937 | Guenther et al. | 260—458 |
| 2,655,496 | 10/1953 | Adams | 260—29.6 EM UX |
| 3,049,500 | 8/1962 | Howland et al. | 260—29.6 EM X |

JULIUS FROME, Primary Examiner

J. B. LOWE, Assistant Examiner

U.S. Cl. X.R.

260—29.6 R, 29.6 Z, 29.7 SO